Feb. 21, 1933.  J. A. WILLOUGHBY  1,898,474
AIRCRAFT LANDING SYSTEM
Filed Jan. 19, 1929  7 Sheets-Sheet 1
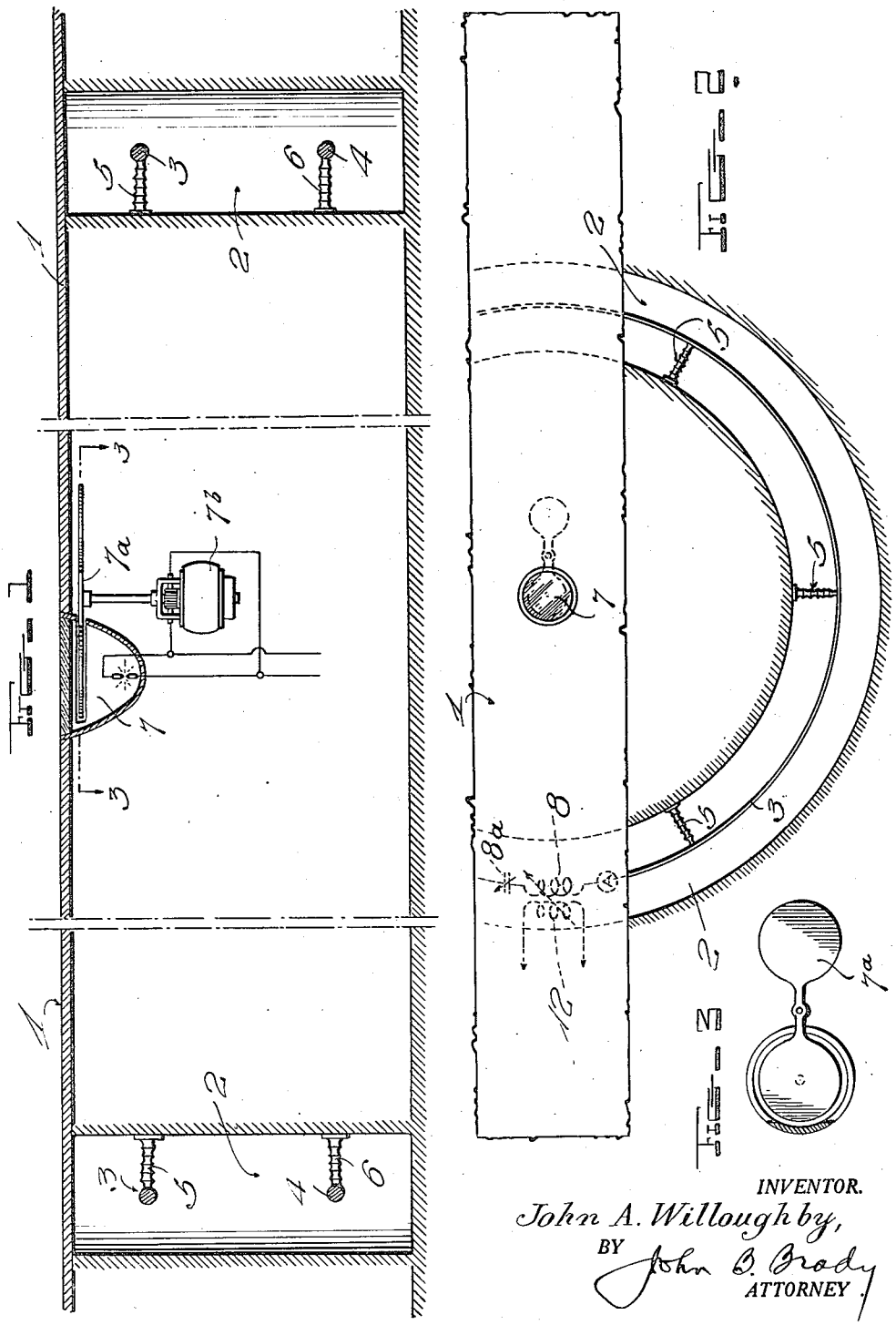
INVENTOR.
John A. Willoughby,
BY John B. Brody
ATTORNEY

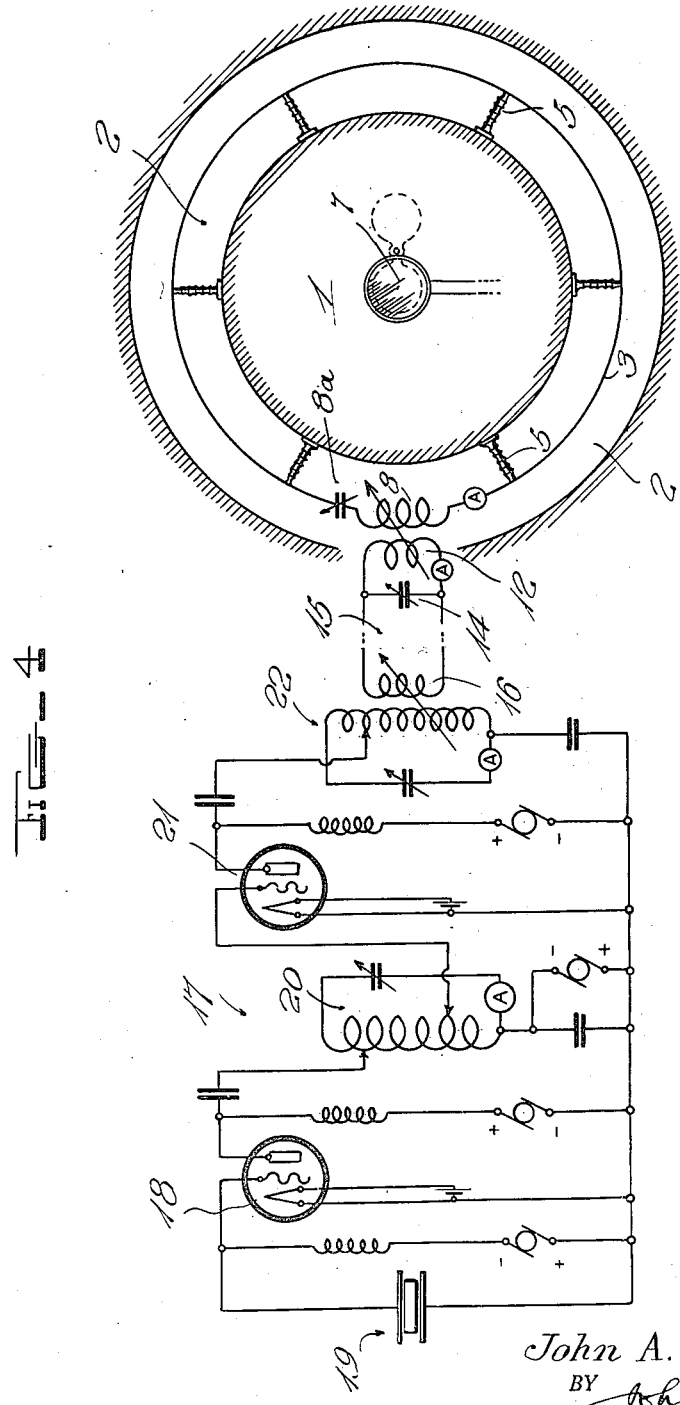

Feb. 21, 1933.  J. A. WILLOUGHBY  1,898,474
AIRCRAFT LANDING SYSTEM
Filed Jan. 19, 1929    7 Sheets-Sheet 3
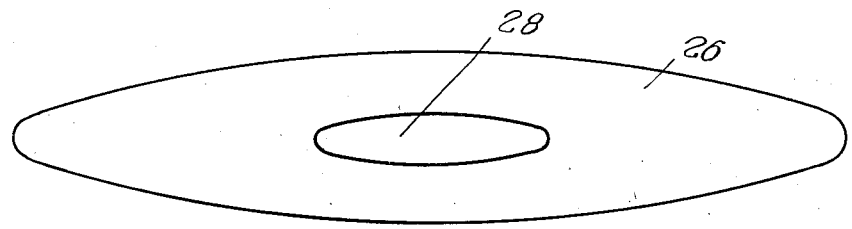
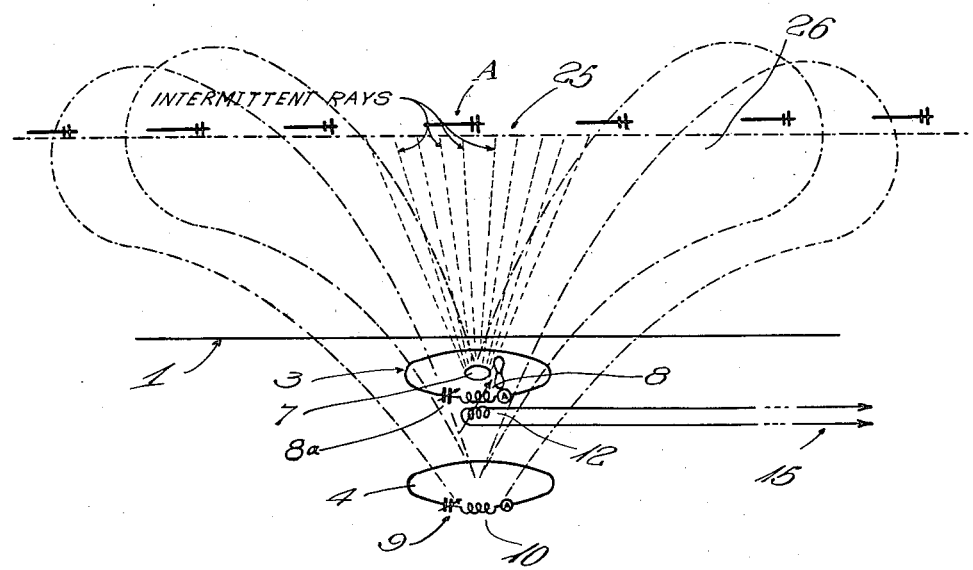
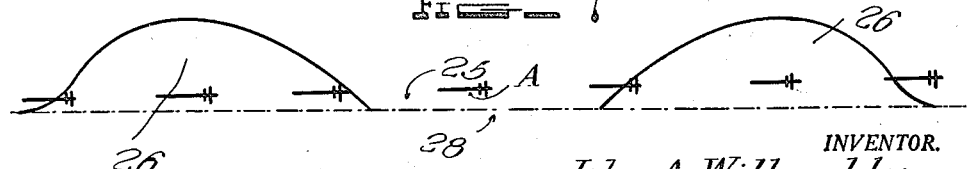
INVENTOR.
John A. Willoughby,
BY
ATTORNEY.

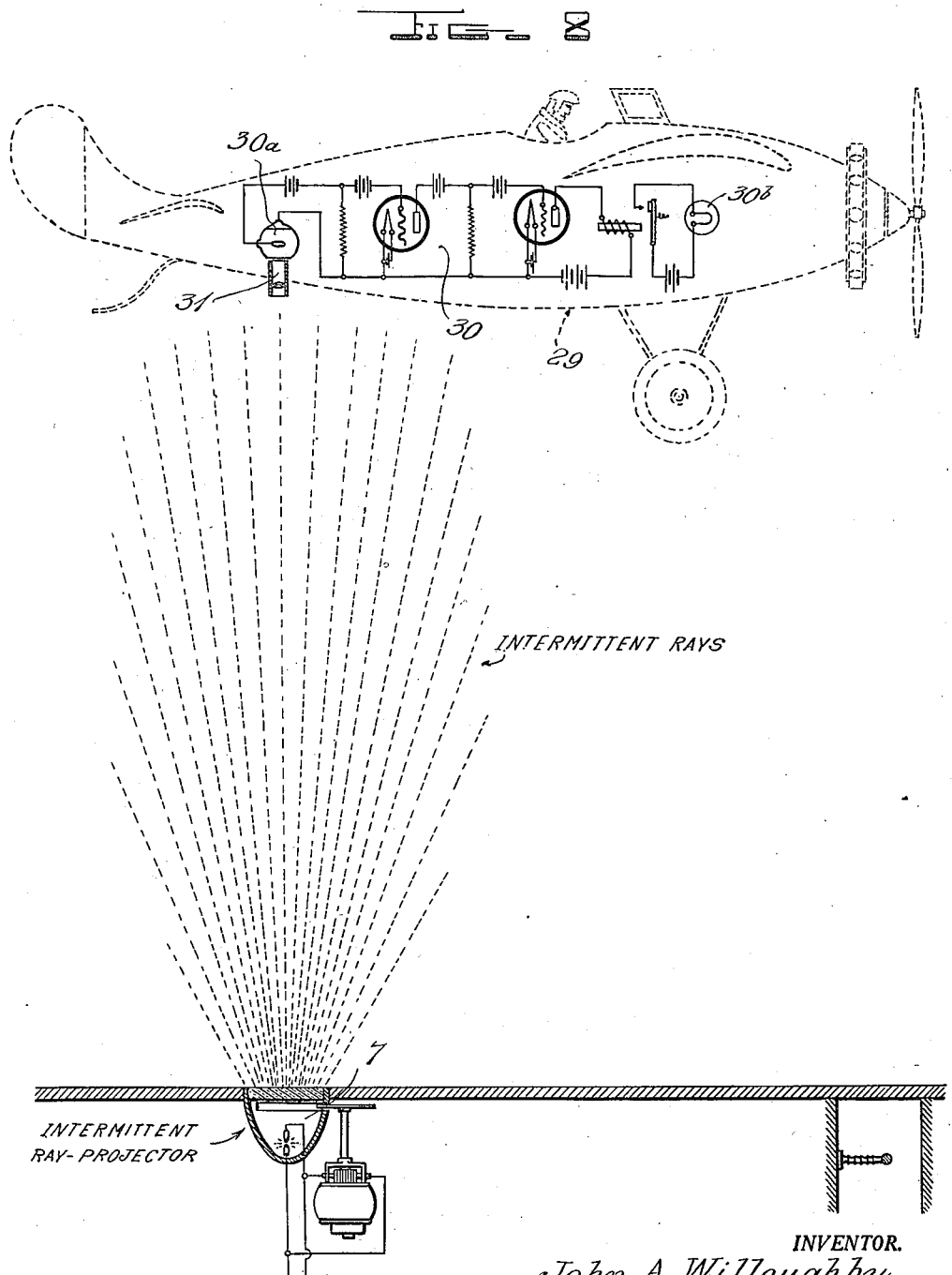

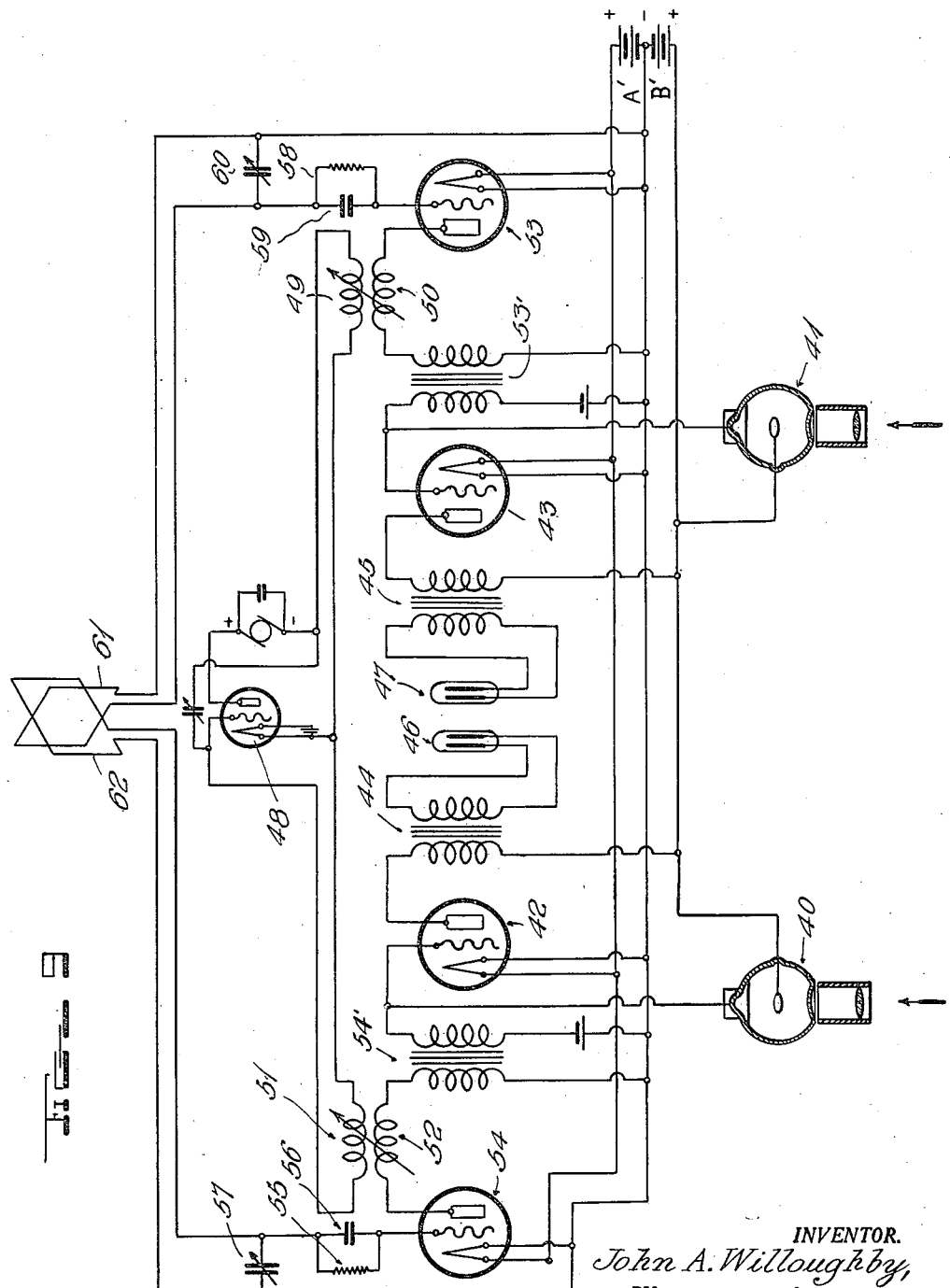

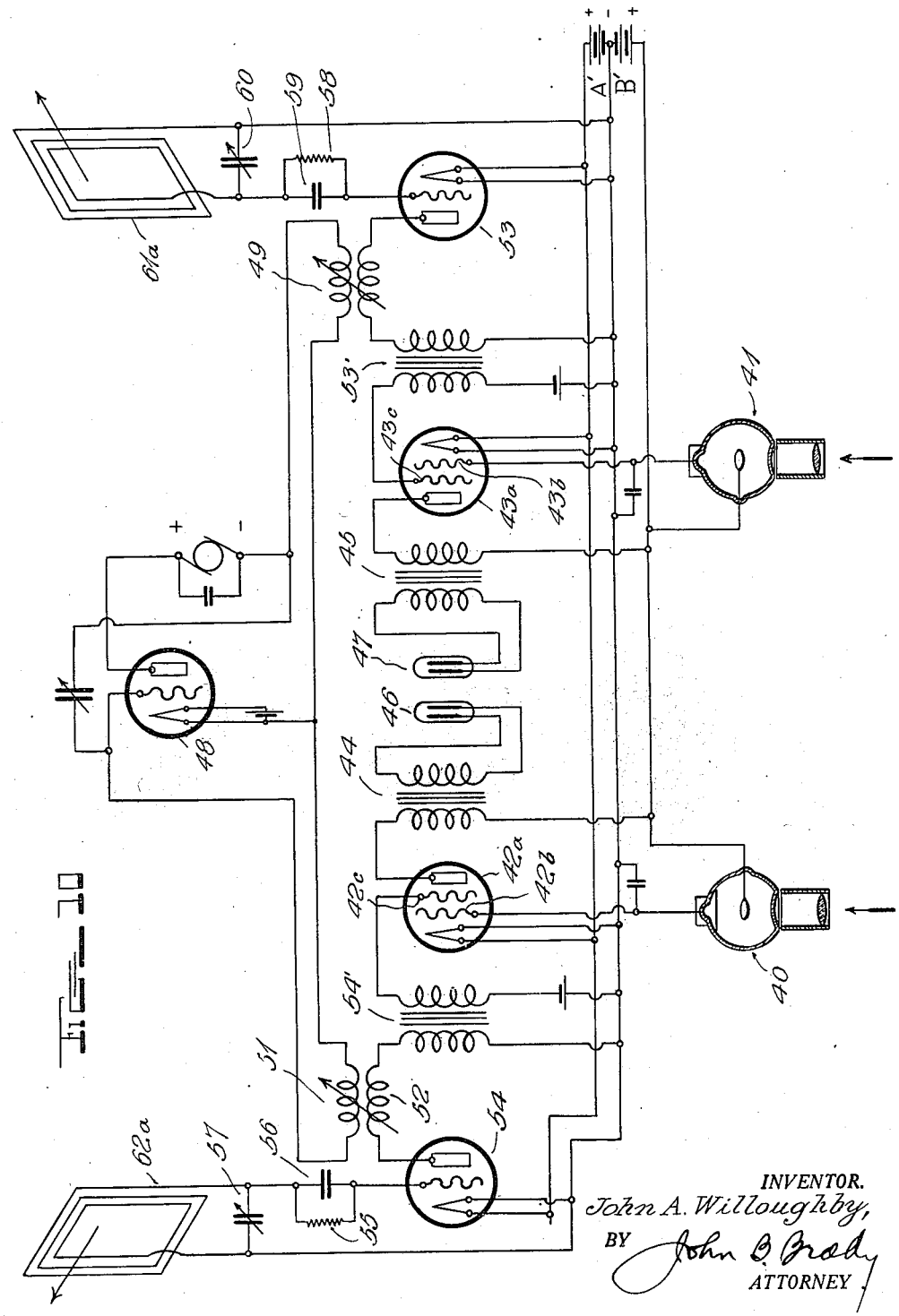

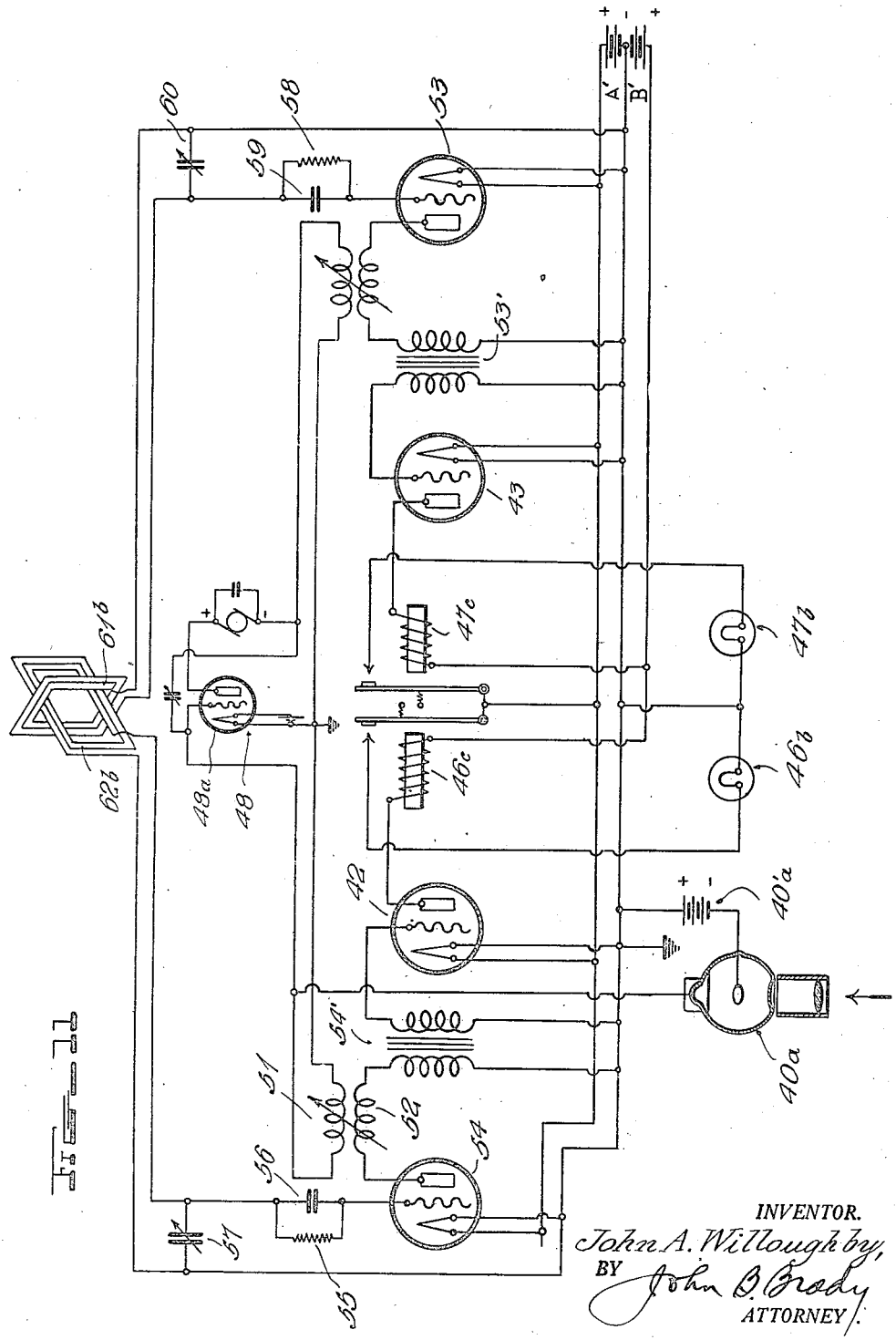

Patented Feb. 21, 1933

1,898,474

UNITED STATES PATENT OFFICE

JOHN A. WILLOUGHBY, OF CAMBRIDGE, MASSACHUSETTS

AIRCRAFT LANDING SYSTEM

Application filed January 19, 1929. Serial No. 333,703.

My invention relates broadly to apparatus for aiding navigation of aircraft and more particularly to a system for assisting a pilot in effecting a landing at night and in foggy weather.

One of the objects of my invention is to provide an improved aircraft landing system in which a high frequency electromagnetic field of energy is established in predetermined zones above an aircraft landing field for actuating a signal receiving apparatus aboard the aircraft and indicating to the pilot the position of the field to enable the pilot to effect a safe landing.

Another object of my invention is to provide a system for establishing high frequency electrical energy in predetermined zones above an aircraft landing field wherein the radiating apparatus is located below the surface of the landing field or below the deck of an aircraft carrier for creating by mutual action upon each other an area of electromagnetic activity which will aid the pilot in effecting a safe landing.

Still another object of my invention is to provide a combined system of radiation for use on aircraft landing fields wherein a radio frequency electromagnetic field may be established in predetermined zones above the landing field and radiation of a different character, such as visible light or adjacent spectra, independently established above the landing field in definite relationship to the zones of activity of the radio frequency electromagnetic field for operating independently upon receiving apparatus carried by aircraft apparatus for indicating to the pilot the best portion of the field upon which to effect a landing.

A further object of my invention resides in the structural arrangement of a radiation system which may be located below the surface of an aircraft landing field or below the deck of an aircraft carrier for establishing above the field or deck, zones of electromagnetic activity which may be located by aircraft in flight by the effect of the electromagnetic energy upon receiving circuits carried by the aircraft for indicating to the pilot the position of the field or deck even under conditions of fog or darkness for effecting a safe landing of the aircraft.

A still further object of my invention is to provide an arrangement of antenna system for the electromagnetic radiation of energy in predetermined zones in which parts of the antenna system are electrostatically and inductively coupled with respect to each other and positioned to react electrically one upon the other for establishing predetermined zones of active radiated field particularly applicable in the guiding of aircraft for effecting a safe landing on an aircraft landing field or deck of an aircraft carrier.

Other and further objects of my invention will be understood from the specification hereinafter following by reference to the accompanying drawings.

Heretofore I have secured United States Letters Patent 1,555,345, dated September 29, 1925, relating to a system of aircraft landing where the loop systems are conductively connected and located above the surface.

My present invention is directed to a system of loops which may be inductively or electrostatically coupled or conductively connected, which loops are located beneath the surface of the landing field in combination with the visible or invisible ray transmitter as set forth hereinbefore.

My invention is particularly applicable for the landing of aircraft or dirigibles on the tops of buildings or floating airports as well as aircraft carriers and permanent mooring masts.

Reference is also had to my copending applications Serial No. 331,001 filed January 8, 1929; for radio direction finding system; No. 331,003, filed January 8, 1929, for radio direction finder; and No. 331,004, filed January 8, 1929, for piloting system.

Referring to the drawings, Figure 1 is a cross-sectional view in vertical elevation through a portion of the aviation field showing the manner in which the antenna system and the luminous beacon are positioned in a pit; Fig. 2 shows a top view in fragmentary section of the portion of the aviation field in which the signaling system and beacon are located; Fig. 3 is a detailed view of the shutter mechanism employed to interrupt the rays from the beacon; Fig. 4 is a plan view in which the relative position of the antenna system with respect to the source of rays is shown and in which the manner of exciting the antenna system is illustrated; Fig. 5 is a hypothetical representation of the field intensity of the antenna in a plane above an aircraft landing field or deck of an aircraft carrier equipped in accordance with this invention; Fig. 6 is a diagrammatic representation of an aviation field showing the field distribution of the signal transmitting system and the rays of the beacon located upon the aviation field in accordance with this invention; Fig. 7 is a hypothetical representation of the field distribution in a vertical plane through the aviation field; Fig. 8 is a view illustrating the manner in which certain features of this invention are applied to aircraft landing; and Figs. 9, 10 and 11 are schematic diagrams of connections illustrating various manners in which apparatus employed in aircraft in accordance with this invention is connected.

My invention contemplates the establishment of zones of energy of different characteristics above the landing field or the deck of an aircraft carrier which energy is made apparent aboard the aircraft by the operation of signal receiving instruments which respond to the beams of energy of different characteristics emitted from the landing field and enable the pilot to locate the landing field even under conditions of fog or darkness.

According to this invention two loops each comprising one or more turns are tuned to substantially the same frequency and are positioned one above the other beneath the surface of an aircraft landing field or deck of an aircraft carrier. The loop nearest to the surface is coupled to a circuit having high frequency oscillations impressed thereon. High frequency energy is introduced into the lower of the loop antennæ in such manner that at a given instant the current in the lower loop is substantially equal but opposite in phase to the current in the upper loop.

The characteristics of the loop antennæ system are such that the field intensity increases in magnitude in directions radially from the center of the system for a certain distance after which a sudden decline in magnitude is evidenced. An area of neutral field exists directly over the center of the loop antennæ system when the loop antennæ employed are parallel to and directly above each other. An emitter of infra-red rays or visible or invisible rays which are detectable aboard the aircraft for the more precise location of the landing field is provided in the area within or very near the loop antennæ system for projecting a beam of radiant energy directly over the field.

Electromagnetic radiation transmitted from the loop antennæ system may extend to a height of 10,000 feet or more whereas the visible radiation may extend to a height of 5000 feet, according to the radiating apparatus employed in practice. The area covered by the radiation propagated from the loop antennæ system may have a diameter of five miles at a height of 5000 feet whereas the diameter of the area covered by the visible radiation or adjacent spectra may be only one mile at the same height. By observing the indications of the different instruments while operating the aircraft over the landing field the pilot or navigator will be able to determine over which portion of the field the aircraft is operating. In case of fog or darkness the centrally located source of radiations in the visible or adjacent spectra may be caused to emit rays of high fog penetrating power which affect photo-electric cells positioned upon the aircraft and inform the pilot that the craft is over the field.

Energy radiated from the loop antennæ system is received by suitable antennæ positioned upon the aircraft and caused to operate proper signaling devices whereby the pilot determines whether the craft is moving into a more or less intense field. In case the signaling devices operated through the action of energy transmitted from the loop antennæ system show that the craft is proceeding to an area of less intense field strength the pilot will be informed by the signaling system receiving energy from the centrally located beacon, if the craft is progressing over the center of the field. The exact location of the landing field is thus obtained by the pilot or navigator of the aircraft.

Referring to the drawings in detail, reference character 1 designates the surface of the aircraft landing field or deck of an aircraft carrier. Extending beneath the surface of the aircraft landing field or deck there is a trench system designated at 2. Provision is made as represented at 2 for housing two separate loop systems positioned at 3 and 4 and insulated from surrounding structure by pedestal or other suitable insulators 5 and 6. A source 7 of radiations such as light rays or infra-red rays is positioned within or adjacent to the loop antennæ. A rotating shutter mechanism 7a is provided to the source 7 for interrupting the rays intermittently. Motor 7b is provided for rotating the shutter mechanism 7a.

In Fig. 2 a fragmentary top view in partial cross-section of the portion of the landing field in which the loop antennæ and the beacon 7 are positioned is shown. Coupling inductance 8 and condenser 8a are provided in the circuit of the loop 3. Inductance 12 is coupled to the inductance 8 for the purpose of transferring exciting energy to the loop 3. A detailed view of the rotating shutter 7a is shown in Fig. 3. The number of light interrupting vanes provided to this shutter mechanism may be varied in order that the light or other rays transmitted from the source 7 may be interrupted at a predetermined rate. For example, the vanes on the shutter may be arranged in such a manner that a telegraphic code is transmitted by the intermittent flashes. The light ray responsive apparatus on board the aircraft intercepting the light rays will reproduce this code and the indentity of the landing field will at once become known.

In Fig. 4 is illustrated the manner in which the loop antenna 3 is excited through the cooperation of a high frequency oscillation generator and its associated amplifiers. Coupling inductance 12 is connected to a condenser 14 and radio frequency oscillation transmission line 15. Inductance 16 is connected to the transmission line 15 and is coupled to the inductance 22 which is associated with the power amplifier electron discharge device 21. An oscillation generator whose frequency is stabilized by piezo electric element 19, includes an electron discharge device 18 and an oscillatory circuit 20 and is employed to excite the power amplifier electron discharge device 21.

Other oscillation generators having substantially constant frequency characteristics may be empolyed in place of piezo electric element frequency stabilized oscillation generators. The oscillation generator employed for exciting the loop antenna 3 may also be employed for simultaneously or alternately exciting an antenna system employed in transmitting high frequency signals for guiding aircraft to the landing field.

In Fig. 5 a horizontal plane through the wave transmitting medium above the signaling system over the landing field is shown with a hypothetical representation of the horizontal potential distribution of the signaling energy. The maximum intensity of the signaling energy is concentrated in the area within the ring 26. An area 28 indicates neutral zone within ring 26.

In Fig. 6 is illustrated the resulting field of electromagnetic activity at 26, the neutral zone at 25 and the visible or invisible ray field at 28 through which the aircraft A must pass in order to enable the pilot to determine the more precise location of the landing field. A graphical representation of the field intensity in the medium above the landing field is shown in Fig. 7. The aircraft A should pass through areas 26 of high field intensity and the neutral area 25 through which radiations in the visible or adjacent spectra, adapted to actuate photoelectric cells, are projected above the central portion of the landing field.

In Fig. 8 an aircraft 29 equipped with apparatus 30 responsive to radiation in the visible or adjacent spectra is shown. The radiant energy rays which in this case comprise the radiation in the visible or adjacent spectra enter the fuselage of the aircraft through an opening fitted with a tube 31 coated on the interior with lampblack or other dead black substance. The object of providing the tube 31 in the fuselage through which the rays enter is to prevent rays other than those projected directly from below the aircraft from entering the opening. Rays projected from the source 7 cause the photoelectric cell 30a to become operative and as a result the circuit of the light source 30b to be closed intermittently in accordance with the interrupted rays projected from the source 7. The light source 30b is visible to the operator and its intermittent or flickering operation informs the pilot of his position over the airport.

In Fig. 9 is illustrated a schematic circuit diagram of connections illustrating a manner in which the apparatus employed in aircraft in accordance with this invention is connected. Light sensitive cells 40 and 41 which may be of the selenium type or any other type of photoelectric cell well known in the art, are connected to the grid electrodes of the electron discharge devices 42 and 43, respectively. Coupling devices 44 and 45 are connected to the plate electrodes of electron discharge devices 42 and 43 and to the glow lamps 46 and 47 respectively. A low frequency oscillation generator 48 is coupled through inductances 49 and 51, which are included in its circuits, and the inductances 50 and 52 to the anode circuits of electron discharge devices 53 and 54 which include the inductances 50 and 52, respectively.

Grid leak resistances 55 and 58 and grid condensers 56 and 59 are connected to the grid electrodes of electron discharge devices 54 and 53, respectively. Coupling devices 53' and 54' are employed to couple the anode circuits of electron discharge devices 53 and 54 to the grid circuits of devices 43 and 42, respectively. Variable condensers 57 and 60 are connected across the loop antennæ 62 and 61 respectively and to the input circuits of electron discharge devices 54 and 53, respectively. Source A' is provided for energizing the filaments of device 42, 43, 53 and 54. Source B' is provided for energizing the photoelectric cells 40 and 41 and the anode circuits of devices 42 and 43.

In operation signals from a signal transmitting station located at an airport are intercepted equally by the directive antennæ 61 and 62 if the aircraft proceeds directly toward the transmitting station. Signaling energy from loop antenna 62 is impressed upon the input circuit of device 54. Energy from the loop 61 is impressed upon the input circuit of the device 53. When the anode of the device 54 is electrically positive with respect to the cathode by virtue of a positive potential being impressed upon it through the operation of the low frequency oscillation generator 48, energy modulated in accordance with signals impressed upon the input circuit of device 54 is impressed through the circuits of the device 42 and transformer 44 upon the glow lamp 46. Likewise when the anode of the device 53 is electrically positive with respect to its cathode and the anode of device 54 is electrically negative with respect to its cathode through the operation of the low frequency oscillation generator 48 which furnishes the excitation energy for the anode circuits of devices 53 and 54, energy modulated in accordance with signaling energy impressed upon the input circuit of device 53 is impressed upon the glow lamp 47 through the action of device 43 and transformer 45. The lamps 46 and 47 alternately glow with substantially equal intensity when the loop antennæ 61 and 62 intercept signaling energy of equal or approximately equal magnitude.

When intermittent rays of radiation impinge upon the photoelectric cells 40 and 41, positive potential is intermittently impressed upon the grid electrodes of devices 42 and 43. The glow lamps 46 and 47 are thus caused to flicker alternately and intermittently in accordance with the interrupted rays transmitted to the light sensitive cells 40 and 41.

In Fig. 10 is shown a modified form of the circuit arrangement such as illustrated in Fig. 9 wherein electron discharge devices having a plurality of grid electrodes whereby the action of the glow lamps 46 and 47 is more effectively controlled by the light sensitive cells 40 and 41, are employed. The light sensitive cells 40 and 41 are connected to the grid electrodes 42b and 43b of the devices 42a and 43a, respectively. Devices 42a and 43a may be of the shield grid type or they may be of the plural grid electrode type in which case the light sensitive cells are connected to either one of the grid electrodes.

The operation of the circuit arrangement shown in Fig. 10 is substantially the same as the operation of the circuit arrangement shown in Fig. 9 in that energy collected by the directional antenna 62 is caused to affect the operation of the glow discharge lamp 46 and the energy collected by the directional antenna 61a is caused to affect the operation of the glow discharge lamp 47.

In Figure 11 is shown a modified form of the circuit arrangement adapted for use where substantially constant radiant energy is transmitted from the source 7 of the landing field. Photoelectric cell 40a is connected to the grid electrode of electron discharge device 48a which is connected into the circuits of the low frequency oscillation generator 48. Relays 46c and 47c are connected to the anode electrodes of devices 42 and 43. Lamps 46b and 47b are connected into circuit with the source of current supply A' and armatures provided to the relays 46c and 47c. When signaling energies of substantially equal intensity are impressed upon the input circuits of devices 53 and 54, the circuits of both of the lamps 46b and 47b are closed alternately by virtue of the operation of the low frequency oscillation generator 48. When the aircraft proceeds over the aviation field and radiant energy such as light rays or adjacent spectra, is intercepted by the photoelectric cell 40a, the grid electrode of the device 48a receives a negative charge whereby its operation is blocked while these radiations are transmitted to the photoelectric cell 40a. The electron discharge devices 54 and 53 are not energized while the oscillation generator 48 is thus "blocked". The currents in the anode circuits of devices 42 and 43 decrease and the circuits of the lamps 46b and 47b are opened. The lamps 46b and 47b are, therefore not energized when radiant energy is intercepted by the cell 40a.

Having thus described my invention in several modified embodiments and realizing that other modifications thereof may be made without departing from the spirit and scope of this invention I do not intend that this invention should be limited to those embodiments described in the foregoing specifications but only by the scope of the annexed claims.

What I claim as new and desire to secure by Letters Patent of the United States is as follows:

1. In a system for guiding aircraft the combination of a plurality of electron discharge devices, a plurality of antennæ, each of said antennæ being in electrical relation with a circuit of an electron discharge device for impressing signaling energy thereon, means for periodically and intermittently energizing circuits of said electron discharge devices having said antennæ in electrical relation therewith, said means comprising a low frequency oscillation generator connected to the respective plate circuits of said electron discharge devices, indicating instruments, means for coupling said indicating instruments to said energized circuits of said last mentioned electron discharge devices, and light sensitive cells in electrical relation with said last mentioned means whereby the operation of said indicating instruments is governed by radiant energy intercepted by said light sensitive cells.

2. In an aircraft landing system the combination of a signal reception system having an antenna associated therewith for impressing signaling energy upon its circuits and having light sensitive cells associated therewith for governing the operation of said circuits in accordance with radiant energy intercepted thereby, said signal reception system being located in an aircraft, means located upon an airport for transmitting electromagnetic waves vertically above said airport, a source of radiations in the visible or adjacent spectra located upon said airport for transmitting a beam of such radiations vertically over said airport the cross-sectional area of said beam being substantially less than the cross-sectional area covered by said vertically transmitted electromagnetic waves whereby said aircraft equipped with said signal reception system may determine the location of said airport.

3. In an aircraft landing system the combination of a signal reception system having an antenna in electrical relation therewith for impressing signaling energy upon its circuits and having light sensitive cells in electrical relation therewith for governing the operation of said circuits in accordance with radiant energy intercepted thereby, said signal reception system being located in an aircraft, means located upon an airport for transmitting electromagnetic waves in a shaft vertically above said airport, said shaft of electromagnetic waves being characterized by having a neutral zone substantially in the center thereof, a source of radiant energy positioned upon said airport for transmitting a diverging shaft of radiations in the visible or adjacent spectra vertically through said neutral zone whereby said aircraft equipped with said signal reception system may determine the precise location of said airport.

4. In an aircraft landing system the combination of a signal reception system having an antenna in electrical relation therewith for impressing signaling energy upon its circuits and having light responsive means in electrical relation therewith for governing the operation of said circuits in accordance with radiant energy intercepted thereby, said signal reception system being located in an aircraft, means located upon an airport for transmitting electromagnetic waves in a shaft vertically over said airport, said shaft of electromagnetic waves being characterized by having a neutral zone substantially over the center of said airport, a source of radiant energy positioned upon said airport for transmitting a diverging shaft of radiations in the visible or adjacent spectra vertically through said neutral zone, means for intermittently interrupting said last mentioned radiations whereby said aircraft equipped with said signal reception system may determine the precise location of said airport.

5. In a piloting system for aircraft, a pair of substantially horizontal and similar coil antennæ positioned substantially one above but spaced from the other, a source of radio frequency energy, means for impressing said radio frequency energy on said coil antennæ substantially equally but in opposed phase, a source radiant energy propagating radiations vertically upward, an equi-signal radio direction finding receiving system carried on said aircraft comprising a pair of crossed coil antenna connected respectively to the inputs of a pair of electron tube units, signal responsive devices connected respectively to the outputs of said electron tube units, and a pair of photoelectric cells adapted to be actuated by said radiations from below and electrically connected for controlling said electron tube units respectively.

6. In a piloting system for aircraft, a pair of substantially horizontal and similar coil antennæ positioned substantially one above but spaced from the other, a source of radio frequency energy, means for impressing said radio frequency energy on said coil antennæ substantially equally but in opposed phase, a source of radiant energy projecting radiations vertically upward, means for interrupting said last mentioned radiations according to a predetermined characteristic, an equi-signal radio direction finding receiving system carried on said aircraft comprising a pair of crossed coil antennæ connected respectively to the inputs of a pair of electron tube units, signal responsive devices connected respectively to the outputs of said electron tube units, and a pair of photoelectric cells adapted to be actuated by said radiations from below and electrically connected for controlling said electron tube units respectively.

7. In a piloting system for aircraft, a pair of substantially horizontal and similar coil antennæ positioned substantially one above but spaced from the other, a source of radio frequency energy, means for impressing said radio frequency energy on said coil antennæ substantially equally but in opposed phase, a source of radiant energy projecting radiations vertically upward, means for interrupting said last mentioned radiations according to a predetermined characteristic, an equi-signal radio direction finding receiving system carried on said aircraft comprising a pair of crossed coil antennæ connected respectively to the inputs of a pair of electron tube units, visual signal responsive devices connected respectively to the outputs of said electron tube units, and a pair of photoelectric cells adapted to be actuated by said radiations from below and electrically connected for controlling said electron tube units respectively.

8. In a piloting system for aircraft, a pair of substantially horizontal and similar coil antennæ positioned substantially one above but spaced from the other, a source of radio frequency energy, means for impressing said adio frequency energy on said coil antenna ubstantially equally but in opposed phase, a ource of radiant energy projecting radiaions vertically upward, an equi-signal radio lirection finding receiving system carried on aid aircraft comprising a pair of crossed coil ntennæ, a pair of electron tubes having their nputs respectively connected to each of said oil antennæ, a pair of four electrode electron ubes each having one grid connected to the espective outputs of said first mentioned lectron tubes, a pair of photoelectric cells dapted to be actuated by energy from below nd respectively connected to the other grid f each of said four electrode electron tubes or respectively controlling said four elecrode electron tubes, and signal responsive pparatus connected to the outputs of said our electrode electron tubes.

9. In a piloting system for aircraft, a pair f substantially horizontal and similar coil ntennæ positioned substantially one above ut spaced from the other, a source of radio requency energy, means for impressing said adio frequency energy on said coil antennæ ubstantially equally but in opposed phase, a source of radiant energy projecting radiaions vertically upward, an equi-signal radio lirection finding receiving system carried on aid aircraft comprising a pair of crossed coil ntennæ, a pair of electron tubes having their nputs respectively connected to each of said oil antennæ, an electron tube generator of ow frequency oscillations connected for alernately impressing positive voltages upon he anodes of said electron tubes, a pair of elays respectively in electrical relation with he outputs of each of said electron tubes, a pair of indicating devices respectively conrolled by said said relays, and a photoelecric cell adapted to be actuated by radiations rom below and electrically connected for conrolling the oscillations of said electron tube generator when actuated by incident radiaions.

In testimony whereof I affix my signature.

JOHN A. WILLOUGHBY.